United States Patent

[11] 3,631,254

[72] Inventor Dennis O. Covault
  Garland, Tex.
[21] Appl. No. 889,406
[22] Filed Dec. 31, 1969
[45] Patented Dec. 28, 1971
[73] Assignee Texas Instruments Incorporated
  Dallas, Tex.

[54] OBJECT IDENTIFICATION BY EMISSION POLARIZATION
15 Claims, 8 Drawing Figs.

[52] U.S. Cl. .................................................. 250/225,
  350/83.3 H, 356/116, 356/118
[51] Int. Cl. ............................................................ G02f 1/18
[50] Field of Search ........................................... 250/83.3 H,
  83.3 R, 83.3 HP, 225; 73/15; 356/114, 116, 118

[56] References Cited
UNITED STATES PATENTS
3,028,596  4/1962  McGillem ....................... 250/83.3 IR

*Primary Examiner*—James W. Lawrence
*Assistant Examiner*—D. C. Nelms
*Attorneys*—Samuel M. Mims, Jr., James O. Dixon, Andrew M. Hassell, Rene E. Grossman, John Vandigriff, Mel Sharp and Richards, Harris & Hubbard ABSTRACT: Metallic objects are identifiable by the degree of polarization of infrared radiation emitted therefrom. To identify a metallic object from a nonmetallic object by radiation emitted therefrom, three linearly polarized detectors are positioned to be responsive to the emitted radiation. Each of these three detectors is responsive to radiation from the object along a different plane of polarization. Output signals from the three detectors are processed in a system to produce a signal equal to the square of the degree of polarization. Smooth objects are distinguishable from rough objects in the same field of view by determining the degree of polarization of a light beam directed to and reflected from the objects. By knowing the polarization axis of the light waves at the source, the output signals of two detectors may be combined to highlight in a display smooth objects in a field of view that contains both smooth and rough objects.

3,631,254
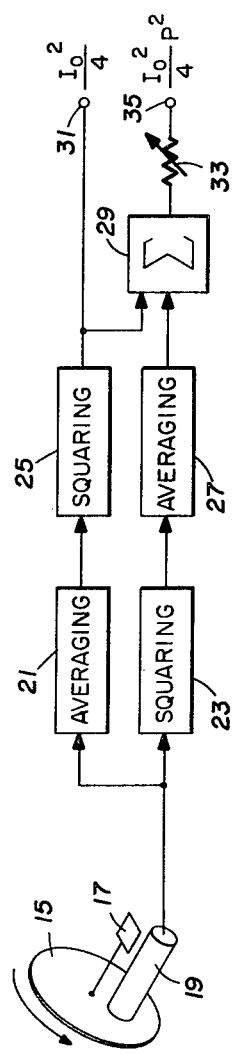
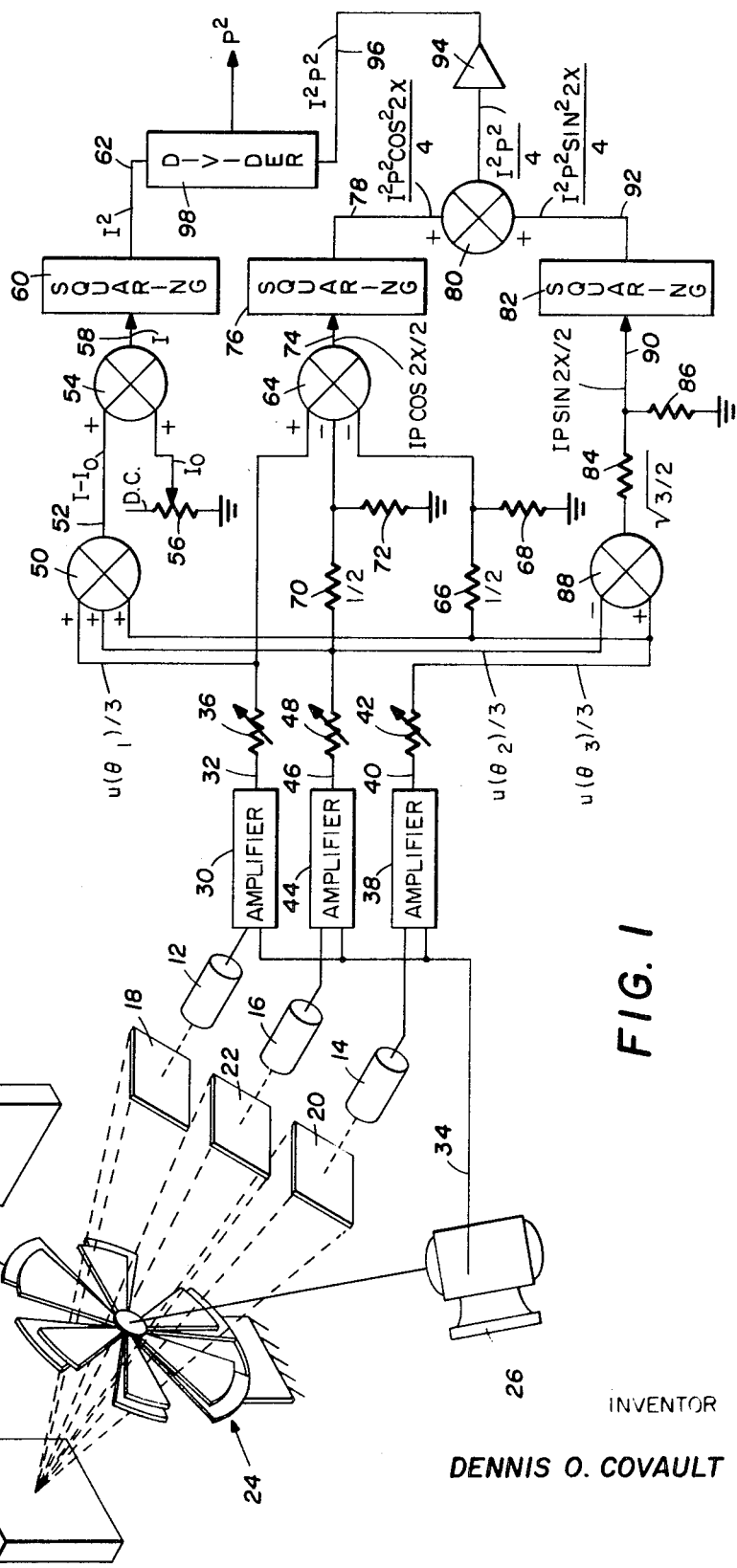
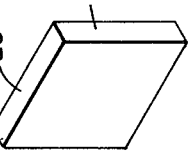
INVENTOR
DENNIS O. COVAULT

INVENTOR
DENNIS O. COVAULT

OBJECT IDENTIFICATION BY EMISSION POLARIZATION

This invention relates to object identification, and more particularly to object identification by means of the degree of polarization of energy received from an object.

Radiation continuously emitted from all objects results from the acceleration of electrical charges within the material. It was early recognized that this emission radiation was polarized to a high degree for metals and that nonmetals had a low degree of emission polarization. Thermal radiation emanating from within an object is unpolarized until it crosses the surface interface. The components of the radiation in the parallel and perpendicular emission planes are transmitted differently in crossing the interface. This difference is a function of the electrical constants of the material and the direction of emission with respect to the normal to the surface, as predicted by Fresnel's equations. It has been exhibited both experimentally and theoretically that the emission polarization is due to refraction of the radiation at the surface of the material. Infrared emission for metallic objects has been shown to be highly polarized, whereas that from nonmetallic objects show a low degree of polarization.

In addition to emitted radiation polarization from an object, it has also been shown that the surface roughness of an object has a direct effect on the changes in polarization of reflected energy. Polarization scattering matrix theory, which is valid at optical wavelengths although it has been most frequently applied at microwave and radio wavelengths, shows that a rough surfaced object depolarizes an incident beam, whereas a smooth surface can polarize an unpolarized incident beam or change the polarization of a polarized impinging light beam. This characteristic of an object, its signature, is wavelength dependent. That is, as the wavelength of the incident radiation increases, a given surface will appear to become smoother. If the roughness of the surface can be indicated by a length parameter, then the wavelength dependence will be most pronounced for surfaces where this parameter is between the maximum and minimum wavelength limits of the illuminating source.

A feature of this invention is to identify an object by the degree of polarization of radiation emitting therefrom. Another feature of this invention is to provide for identification of an object by measuring the degree of polarization of light reflected therefrom. A further feature of this invention is to provide for identification of an object as metallic or nonmetallic by the degree of polarization of radiation emitting therefrom. Still another feature of this invention is to provide for object identification as to a smooth surface or a rough surface by the degree of polarization of light reflected therefrom. A still further feature of this invention is to provide for object identification by determining the degree of polarization or radiation emitting therefrom by measurements along at least three different planes of polarization. An additional feature of this invention is for object identification by measuring the polarization scattering of a polarized light beam reflected from an object to be identified.

In accordance with one embodiment of the invention, and object is identified by measuring the polarized radiometric intensity along at least three different planes of polarization with respect to the object. Radiometric intensity measurements from each of the at least three different planes of polarization are summed to obtain a total intensity measurement. This total intensity measurement is further processed by generating a signal representing the square thereof. Additional processing of the radiometric intensity measurements resulting from each of the planes of polarization produces a signal equal to the square of the degree of polarization of radiation from the target times the square of the total radiation intensity. This last signal is combined with the square of the total intensity measurement in a manner that results in a generated signal equal to the square of the degree of polarization of radiation from an object.

In accordance with another embodiment of the invention, an object is identified as smooth or rough, relatively speaking, by illumination thereof from a radiant energy source polarized along a known axis. Measurements are made of the scattering of the polarized light illuminating the object from along at least two polarization planes by linearly polarized sensitive detectors at angles relative to the polarization axis of the illuminating radiation. These measurements are summed to produce a total intensity measurement of the polarized light reflected from the object. In addition, a signal is generated which is equal to the total intensity times the degree of polarization of the reflected radiation in excess of a threshold. The threshold is established to distinguish between smooth and rough objects. Additional processing of the total intensity measurement signal and the generated signal in excess of the threshold, produces a display signal that may be used to identify an object as smooth or rough by highlighting the smooth objects in a display device.

A more complete understanding of the invention and its advantages will be apparent from the specification and claims and from the accompanying drawings illustrative of the invention.

Referring to the drawings:

FIG. 1 is a block diagram of a system for measuring the degree of polarization of an object from the radiation emitting therefrom;

FIG. 6 is an alternate embodiment of a system for measuring the degree of polarization of an object using a circular polarizer;

Figure 2:
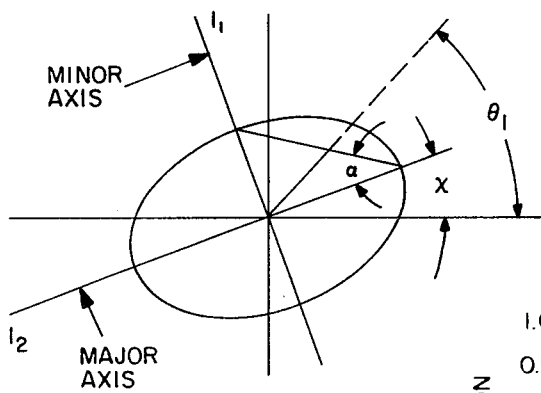
FIG. 2 is a polarization ellipse that represents the path that an electric vector of radiation sweeps, propagating normal to the figure, as determined by the degree of polarization of an object.

Referring to FIG. 1, an object target 10 of unknown composition continuously emits radiation which is incident upon infrared detectors 12, 14 and 16 after passing through polarized filters 18, 20 and 22, respectively. The object target 10 may be in a field of view for the detectors that includes both metallic and nonmetallic objects. A selector wheel 24 rotated by means of an electric motor 26 passes or blocks the radiation emitted from the object target 10 to the detectors 12, 14 and 16. In the position shown, the selector wheel 24 passes radiation emitting from the object target 10 to the detectors. When the selector wheel 24 has been rotated 30°, radiation from the target is blocked and radiation from a reference black body source 28 reflects from the background reflector 24a through the polarized filters 18, 20 and 22 to the detectors 12, 14 and 16. Thus, the radiation incident upon the detectors 12, 14 and 16 alternates every 30° of rotation of the wheel 24 between the target 10 and the reference source 28. Many other methods can be used to alternate the radiation incident on the detectors between the target 10 and the reference source 28. The selector wheel 24 is intended as only one example.

The reference source emits black body or thermal radiation which is defined as the electromagnetic radiation present in any region of empty space at thermodynamic equilibrium at temperature T. Black body radiation is isotropic and unpolarized and has a continuous distribution of frequencies. It is of practical importance to the present invention as a means for referencing the emitted radiation from the target 10.

Each of the polarization filters 18, 20 and 22 is oriented at a different angle from the others to pass only light polarized along a preferred axis to the respective detector in line therewith. There are a number of polarized filters available; typical of these are the wire grid polarizers.

An output signal from the detector 12 alternates proportionally between the radiant flux density from the target 10 and the reference source 28 along the particular polarization axis of orientation of the polarized filter 18. This produces a two-level alternating signal, which after amplification and rectification in an amplifier 30, produces a DC signal on the line 32 proportional to the radiation power difference between the target 10 and the reference source 28 independent of extraneous power sources. The operation of the amplifier 30 is synchronized with the motor 26 to give the correct sign to the DC signal on line 32 by means of a connection 34. An adjustable resistor 36 provides a means for weighting the power difference signal depending on the system response and the number of detectors employed in a system to determine the degree of polarization or radiation emitted from the target 10. Similarly, the detector 14 produces an output signal proportional alternately between the radiant flux density from the target 10 and the reference source 28 along the polarization axis of the polarized filter 20. To determine the degree of polarization or radiation from the target 10, the polarized filter 20 is orientated at an angle independent of the polarized filter 18. An amplifier 38 operates to amplify and rectify the dual level alternating signal resulting from the radiation emitted by the reference source 28 and the radiation emitted by the target 10 to produce a radiation differential signal on a line 40, again independent of extraneous power sources. The operation of the amplifier 38 is also synchronized with the motor 26 by means of the interconnection 34. A variable resistor 42 provides a means for weighting the output of the amplifier 38 by a factor determined by the system response and the number of detectors used. In the same manner, the detector 16 produces an output signal proportional alternately between the radiant flux density from the target 10 and the reference source 28 along the axis of polarization of a polarized filter 22. The polarized filter 22 has the polarization axis oriented at an angle relative to the target 10 independent of the angle of orientation of the polarized filters 18 and 20. Thus, each of the polarized filters 18, 20 and 22 is oriented along a different axis relative to the target 10. Accordingly, the detectors 12, 14 and 16 view the radiation of the target 10 along different planes of polarization. An amplifier 44 operates to amplify and rectify the dual level alternating signal resulting from the emitted radiation of the reference source 28 and the target 10 to produce a radiation differential signal on a line 46 independent of extraneous power sources. The operation of the amplifier 44 is synchronized with the motor 26 by means of the interconnection 34. A variable resistor 48 provides a means for weighting the difference signal on line 46 according to the system response and the number of detectors used.

The weighted output of the amplifier 30 along with the weighted outputs of the amplifiers 38 and 44 are applied to individual input terminals of a summing network 50. Typically, the summing network 50 and other summing networks of the system may be operational amplifiers that produce an output proportional to the sum of the inputs or an output proportional to the difference of one or more inputs. The summing network 50 produces a signal on a line 52 equal to the difference between the total emitted radiation from the target 10 and the total emitted radiation from the reference source 28. This signal is applied to one input of a summing network 54 which has a second input equal to the total radiation emitted by the reference source 28 as established at the wiper arm of a potentiometer 56. Since reference source 28 produces a known output $I_0$, the voltage proportional to that output may be set by the wiper arm of potentiometer 56. By operation of the summing network 54, a signal is produced on a line 58 equal to the total intensity measured by the detectors 12, 14 and 16 independent of the radiation emitted by a reference source 28. This total emitted radiation signal is applied to the input of a squaring network 60 which produces a signal on line 62 equal to the square of the total radiation emitted by the target 10.

In addition to the summing network 50, the weighted outputs of the amplifiers 30, 38 and 44 are applied to inputs of the differential summing network 64. The weighted output of the amplifier 38 is applied to one input of the network 64 through a voltage divider of resistors 66 and 68. Resistors 66 and 68 are sized such that the signal applied to the network 64 is one-half the weighted output of the amplifier 38. Similarly, the weighted output of the amplifier 44 is applied to one input of the network 64 through a voltage divider of resistors 0 and 72. This voltage divider also divides the weighted output of the amplifier 44 by one-half. Network 64 differentially combines the outputs of the amplifiers 38 and 44 with the output of the amplifier 30. An output of the network 64 on line 74 is equal to the degree of polarization of radiation from the target 10 times the total radiation intensity and a term proportional to the angle of the orientation of the polarized radiation, all divided by two. This signal is applied to the input of a squaring circuit 76 which has an output on a line 78 applied to one input of a summing network 80.

A second input to the network 80 is output of a squaring circuit 82 having an input terminal connected to a divider network including resistors 84 and 86. The signal applied to the resistors 84 and 86 is the output of a summing network 88. Network 88 differentially adds the weighted outputs of the amplifiers 38 and 44. By differentially combining these two weighted output signals in the network 88 and applying this signal to the divider network of resistors 84 and 86, a signal is produced on line 90 equal to the degree of polarization of radiation from the target 10 times the total radiation intensity and a term proportional to the plane of the polarized radiation, all divided by two.

Summing network 80 combines the output of the squaring circuit on line 78 and the output of the squaring circuit 82 on line 92 and produces an output signal independent of the orientation of the polarization emitting from the target 10. This signal is amplified in an amplifier 94 which has an output equal to the square of the degree of polarization or radiation emitted from the target times the square of the total radiation intensity appearing on line 96.

The signals on lines 62 and 96 are applied to separate inputs of a divider network 98 which processes the signals in a manner to produce an output signal related to the square of the degree of polarization of radiation from the target 10.

In operation, thermal radiation emitting from within the target 10 is unpolarized until it crosses the surface interface. As discussed previously the components of the radiation in the parallel and perpendicular emission planes are transmitted differently in crossing this interface. This difference is a function of the electrical constants of the material and the direction of emission with respect to the normal of the target surface, as predicted as Fresnel's equation. In order to remotely measure the degree of polarization of received infrared radiation, it is necessary to make at least three radiometric intensity measurements with linearly polarized infrared detectors.

Referring to FIG. 2, the polarization ellipse shown represents the path that an electric vector of radiation sweeps, propagating normal to the figure plane, for a material having a degree of polarization given by the equation:

$$P = \cos 2\alpha = (I_2 - I_1)/(I_2 + I_1) \qquad (1)$$

where $I_1$ and $I_2$ are the intensities of the radiation along the semiminor and semimajor axis, respectively. Since the detectors 12, 14 and 16 are remote to the target 10, the orientation of the polarization ellipse, $\chi$, with respect to the sensing system is unknown. Hence, in general, there are three unknowns; the degree of polarization, $P$, the orientation angle $\chi$ and the total intensity $I = I_2 + I_1$. Accordingly, to determine the degree of polarization, $P$, it is necessary to make at least three radiometric intensity measurements with linearly polarized detectors whose planes of polarization are oriented at three angles, $\theta_1$, $\theta_2$ and $\theta_3$ with respect to the ellipse of FIG. 2, that is, with respect to the surface of the target 10.

A linear polarizer whose plane of polarization is oriented at the angle $\theta_i$ will transmit energy at an intensity given by the expression:

$$I_i = [I_2 \cos^2(\theta_i - \chi) + I_1 \sin^2(\theta_i - \chi)] \tau_o$$
$$= [(I_2 + I_1/2) + (I_2 - I_1/2) \cos^2(\theta_i - \chi)] \tau_o \quad (2)$$
$$= \tau_o I [1 + P \cos 2(\theta_i - \chi)]/2$$

where
$I_i$ = the total intensity transmitted by the linear polarizer,
$I = I_2 + I_1$, and
$P = (I_2 - I_1)/I$ The factor $\tau_o$ represents the attenuation of the radiation by the material of the linear polarizer independent of the angle $\theta_i$. Hence, the total transmission of a linear polarizer as a function of the angle of orientation is given by the equation:

$$\tau(\theta_i) = I_i/I$$
$$= (\tau_o/2)[1 + P \cos 2(\theta_i - \chi)] \quad (3)$$

where $P$ is the degree of polarization of the incident radiation.

In order to obtain a radiometric measurement with an infrared detector, it is necessary to have the calibration source 28 known intensity $I_o$ as a reference for the unknown intensities from the target 10. Thus, the voltage output of a linearly polarized and calibrated infrared detector will be given by the expression:

$$v(\theta_i) = R \tau(\theta_i)(I - I_o) \quad (4)$$

where $R$ is the responsivity of the detector. Black body reference source 28 will be unpolarized, i.e., $P = o$, so that $\tau(\theta_i)I_o = (AHv_o/2)I_o$ and hence equation (4) can be rewritten:

$$v(\theta_i) = R(\tau_o/2)[I - I_o + I P \cos 2(\theta_i - \chi)] \quad (5)$$

To simplify let us define a normalized detector output voltage
$u(\theta_i) = 2v(\theta_i)/R\tau_o$ or
$u(\theta_i) = I - I_o + I P \cos 2(\theta_i - \chi)$
$= I - I_o + I P(\cos 2\theta_i \cos 2\chi - \sin 2\theta_i \sin 2\chi) \quad (6)$ Equation (6) can be written for $N$ linearly polarized detectors in matrix form as:

$$\begin{pmatrix} u(\theta_1) \\ u(\theta_2) \\ \vdots \\ u(\theta_n) \end{pmatrix} = \begin{pmatrix} 1 & \cos 2\theta_1 & \sin 2\theta_1 \\ 1 & \cos 2\theta_2 & \sin 2\theta_2 \\ \vdots & \vdots & \vdots \\ 1 & \cos 2\theta_n & \sin 2\theta_n \end{pmatrix} \cdot \begin{pmatrix} I - I_o \\ IP \cos 2\chi \\ IP \sin 2\chi \end{pmatrix} \quad (7)$$

A matrix equation of the form $u = AI$ has a least squares solution given by $$I = (A^T A)^{-1} A^T u \quad (8)$$

where the superscript $T$ denotes the transpose of the matrix. Equation (7) has the least squares solution:

$$\begin{pmatrix} I - I_o \\ IP \cos 2\chi \\ IP \sin 2\chi \end{pmatrix} = \begin{pmatrix} 1 & \frac{1}{N}\sum_i \cos 2\theta_i & \frac{1}{N}\sum_i \sin 2\theta_i \\ \frac{1}{N}\sum_i \cos 2\theta_i & \frac{1}{2}\sum_i \cos^2 2\theta_i & \frac{1}{N}\sum_i \sin 2\theta_i \cos 2\theta_i \\ \frac{1}{N}\sum_i \sin 2\theta_i & \frac{1}{N}\sum_i \sin 2\theta_i \cos 2\theta_i & \frac{1}{N}\sum_i \sin^2 2\theta_i \end{pmatrix}^{-1} \begin{pmatrix} \frac{1}{N}\sum_i u(\theta_i) \\ \frac{1}{N}\sum_i u(\theta_i) \cos 2\theta_i \\ \frac{1}{N}\sum_i u(\theta_i) \sin 2\theta_i \end{pmatrix} \quad (9)$$

which takes on a very simple form if the planes of polarization of the polarizers 18, 20 and 22 are oriented such that $\theta_i = (i-1)\pi/N$, $I = 1, 2, \ldots N$. With this choice of $\theta_i$, $\sum_i \cos 2\theta_i = \sum_i \sin 2\theta_i = \sum_i \sin 2\theta_i \cos 2\theta_i = 0$ and $\sum_i \cos^2 2\theta_i = \sum_i \sin^2 2\theta_i = N/2$ and equation (9) reduces to:

$$\begin{pmatrix} I - I_o \\ IP \cos 2\chi \\ IP \sin 2\chi \end{pmatrix} = \begin{pmatrix} 1 & 0 & 0 \\ 0 & 2 & 0 \\ 0 & 0 & 2 \end{pmatrix} \begin{pmatrix} \frac{1}{N}\sum_i u(\theta_i) \\ \frac{1}{N}\sum_i u(\theta_i) \cos 2\theta_i \\ \frac{1}{N}\sum_i u(\theta_i) \sin 2\theta_i \end{pmatrix} \quad (10)$$

The weighted sums on the right side of equation (10) can be obtained since $u(\theta_i)$ are measured voltages and the quantities $\cos 2\theta_i$ and $\sin 2\theta_i$ are known parameters. Therefore, the three terms on the left side of equation (10) can be obtained by the indicated operations. The degree of polarization of the radiation, $P$, can then be determined, i.e., if:

$$P^2 = (IP \cos 2\chi)^2 + (IP \sin 2\chi)^2/I^2 \quad (11)$$

The denominator in equation (11), $I^2$, is obtained by adding the known reference signal $I_o$ to the term $I - I_o$ and then squaring.

Referring again to FIG. 1, voltage output, $u(\theta_i)$, of the detectors 12, 14 and 16 are obtained by alternatively viewing the target 10 and reference source 28. The voltage output $u(\theta_i)$ is then applied to the appropriate variable resistor to obtain one-third the normalized voltage given by equation (6) above, that is, $u(\theta_i)/3$.

The dividing factor for any system employing multiple detectors to determine the degree of polarization is related to the number of detectors times the system response, for example, for the system of FIG. 1, the dividing factor for the voltage output of the detector is three.

The weighted output of each of the amplifiers 30, 38 and 44 is fed into the polarization processor to obtain the three quantities of equation (9), that is:

$$I - I_o = \tfrac{1}{3}[u(\theta_1) + u(\theta_2) + u(\theta_3)] \quad (2a)$$
$$(IP \cos 2\chi/2) = \tfrac{1}{3}[u(\theta_1) - \tfrac{1}{2}u(\theta_2) - \tfrac{1}{2}u(\theta_3)]\pi \quad (12b)$$
$$(IP \sin 2\chi/2) = \tfrac{1}{2}[-u(\theta_1) + u(\theta_3) \times \sqrt{3/2}] \quad (12c)$$

where
$\theta_1 = 0°$,
$\theta_2 = 60°$, and
$\theta_3 = 120°$.

The known calibration signal, $I_o$, is added to equation (12a) in the summing network 54 to obtain the total intensity measurement $I$ which is then squared in the network 60 to yield $I^2$. Equation (12b) is the output of the summing network 64 with the right side defining the three inputs thereto. Similarly, equation (12c) gives the output of the summing network 88 and defines the input to the squaring network 82. Squaring the terms on the left of equations (12b) and (12c) and summing them in the network 80 yields the expression $I^2 P^2/4$ which is then amplified by a factor of four to give $I^2P^2$. This signal is then divided by the square of the total intensity, $I^2$, in the dividing network 98 to give the square of the degree of polarization, $P^2$.

Figure 3:
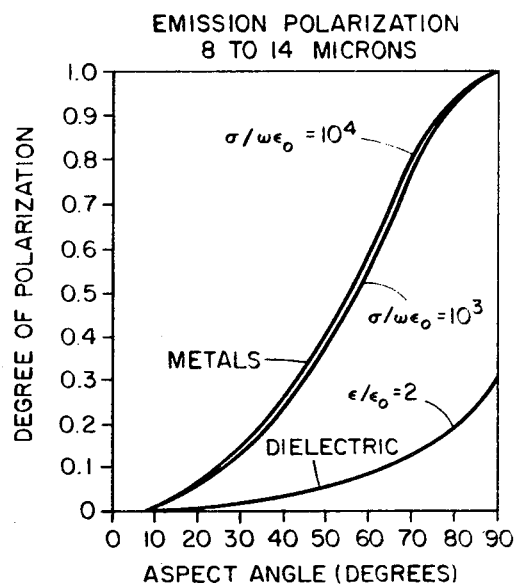
FIG. 3 is a calculated plot of the degree of polarization as a function of aspect angle in degrees, illustrating the emission polarization for metals and dielectrics.

Referring to FIG. 3, there is shown a plot of degrees of polarization as a function of aspect angle for a dielectric and metals in the 8 to 14 micron wavelength region. The aspect angle is the observation angle relative to the normal to the surface of the target 10. The metals are defined by the electrical constants:

$\sigma/\omega\epsilon_o = 10^3$ to $10^4$, and
$\epsilon/\epsilon_o = 1$ where $\sigma$ = the electrical conductivity,
$\omega$ = the angular frequency of the emitted radiation from the target 10, and
$\epsilon$ and $\epsilon_o$ are the dielectric constants of the material and free space respectively. These electrical constants are considered to be representative of metals in the infrared region. The electrical constants for the dielectric are $\sigma/\omega\epsilon_o = 0$
$\epsilon/\epsilon_o = 2$ which are considered representative of good dielectrics in the 8 to 14 micron wavelength region.

As shown by the curves of FIG. 3, the degree of polarization of radiation emitted from an object increases with the aspect angle. However, even at the lower values for the aspect angle, there is considerable difference between the degree of polarization of radiation emitted from metal as compared to the dielectric.

Figure 4:
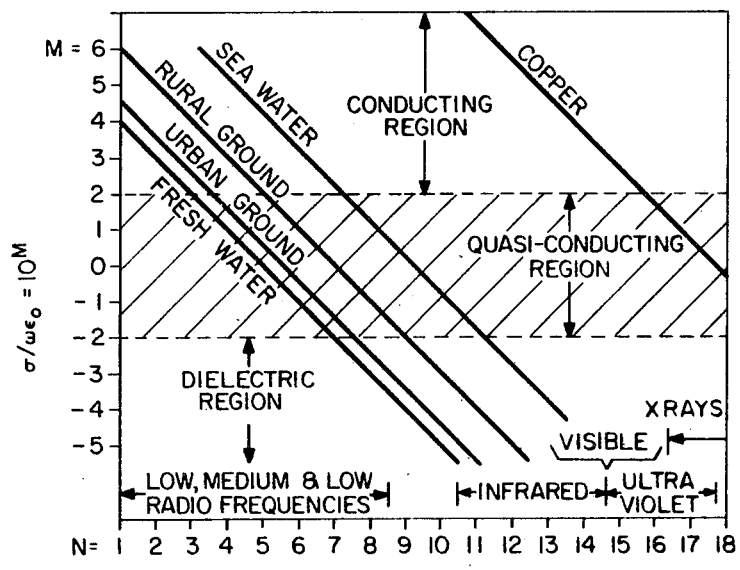
FIG. 4 is a plot of electrical conductivity as a function of a frequency in several different media.

FIG. 4 is a plot of the ratio $\sigma/\omega\epsilon_o$ as a function of frequency for several common media on a log-log plot. In the infrared region of 8 to 14 microns, this ratio for copper can be seen to be between $10^4$ and $10^5$. For dielectrics, however, in the same region, this ratio is minimal. Since the term in the ratio $\sigma/\omega\epsilon_o$ that most affects its value is the material conductivity, it can be shown that the conductivity of the target 10 can be related to the degree of polarization of emitted radiation.

Figure 5:
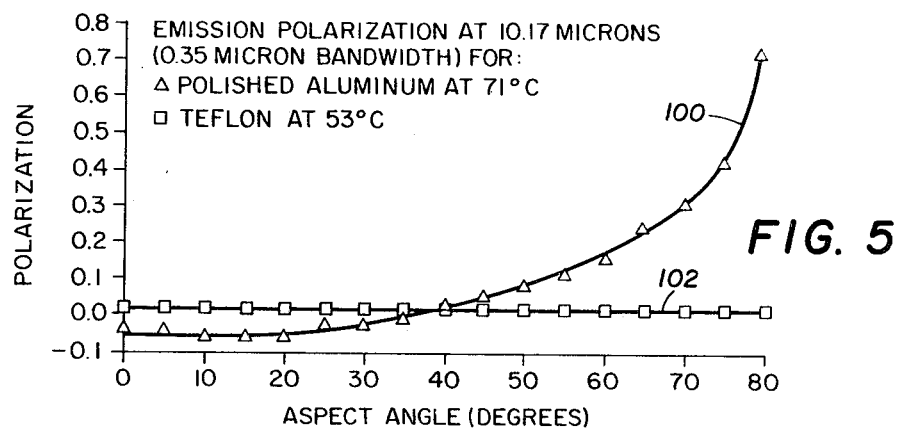
FIG. 5 is a plot of degree of emission polarization measured as a function of aspect angle for polished aluminum and Teflon.

Referring to FIG. 5, there is shown a plot of emission polarization at 10.17 microns for aluminum and Teflon as a function of aspect angle. The polished aluminum sample was maintained at a temperature of 71° C. and the Teflon sample at a temperature of 53° C. The aluminum emission as given by the curve 100 is highly polarized whereas the Teflon emission as given by the curve 102 shows a very low degree of polarization. These results are obtainable by the system of FIG. 1 and are in agreement with experimental results at incandescent temperatures and theoretical predictions obtained from Fresnel's equations.

Referring to FIG. 6, in addition to linear polarized detectors, a circular polarizer 15 driven by a motor 17 may be used to direct polarized radiation to a detector 19. An output from the detector 19 is applied to an averaging network 21 and a squaring network 23. After averaging the intensity signal in the network 21, it is squared in a squaring network 25. The output of the squaring circuit 23, in turn, is averaged in an averaging network 27. Outputs from the averaging network 27 and the squaring network 25 are applied to inputs of a summing network 29. An output of the summing network 29 passes through a variable resistor 33 to an output terminal 35. In addition to the summing network 29, the output of the network 25 appears at the output terminal 31.

If a circular polarizer is used, the following equation for the radiation intensity can be written:

$I(t) = \frac{1}{2}I_o[1 + P\cos 2(\theta + \omega t)]$ (13)

where $\omega$ is the angular speed of the polarizer. If $I(t)$ is integrated over time, $\cos 2(\theta + \omega t)$ goes to zero. If $I(t)$ is squared, $I^2(t) = (I_o^2/4)[1 + 2P\cos 2(\theta + \omega t) + P^2\cos^2(2\theta + \omega t)]$, (14)

and then integrated, $\cos 2(\theta + \omega t)$ again goes to zero and $\cos^2 2(\theta + \omega t)$ goes to ½. Thus, the polarization may be obtained by the operation of the system of FIG. 6 as given by the equation:

$$\frac{\overline{I^2(t)}}{\overline{I(t)}^2} = 1 + (P/2)^2 \quad (15)$$

Figure 8:
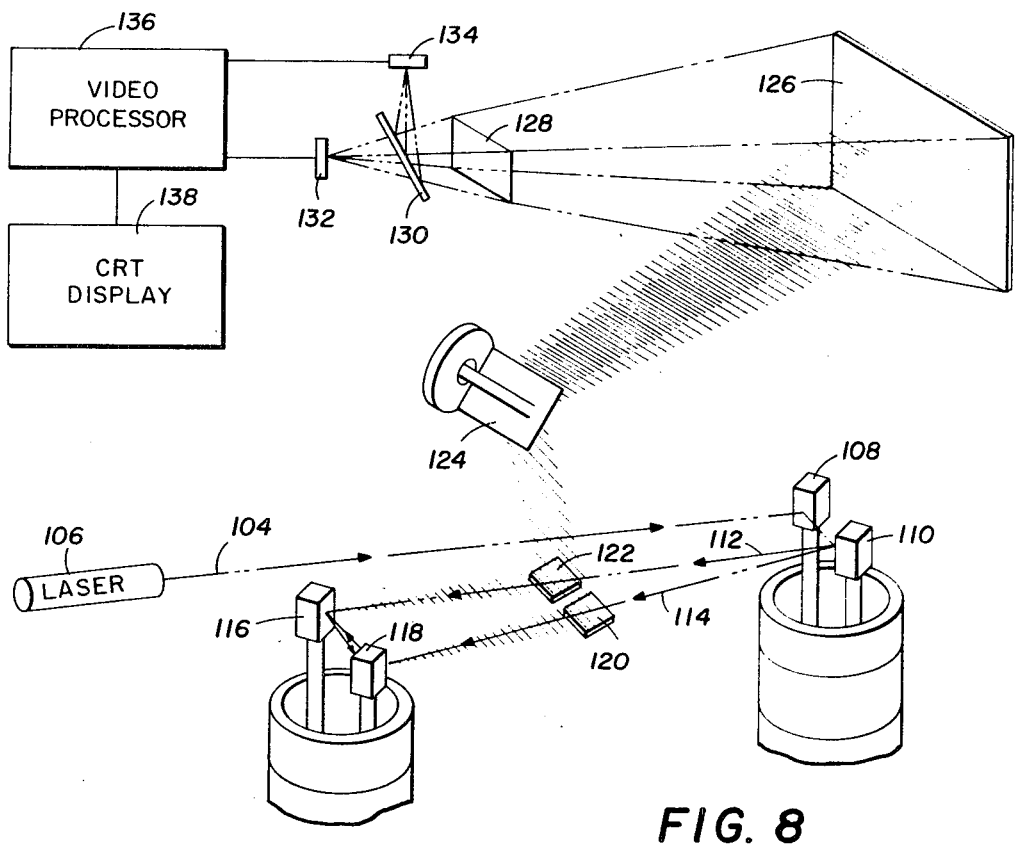
FIG. 8 is a block diagram of a video processor system for the object identification technique illustrated in FIG. 7.

In addition to identifying metallic objects from nonmetallic objects by the degree of polarization of emitted radiation, a smooth object is identifiable from a rough object by the degree of polarization of reflected radiation. Referring to FIG. 8, there is shown an optics diagram and processing circuitry of an active object identification system. A linear polarized monochromatic coherent light beam 104 from a laser 106 propagates to a first mirror 108 of a mirror pair that includes a second mirror 110. These mirrors oscillate in a manner such that the light beam 104 is reflected from the mirror 110 along either path 112 or 114. A light beam along the path 112 is incident on a mirror 116 of a mirror pair that includes a second mirror 118. A light beam impinging on the mirror 116 is reflected to the mirror 118 and reflected therefrom to a mirror 120. A light beam along the path 114 impinges on the mirror 118 and is reflected therefrom to the mirror 116 and again reflected to a mirror 122. Reflection patterns on the mirrors 120 and 122 are directed to a vertical scanner 124 and then projected to a field of view 126 that contains an object target to be identified.

The mirror pair comprising the mirrors 108 and 110 and the mirror pair comprising the mirrors 116 and 118 are part of a magnetostrictive torsional light beam scanner. Each consists of a torsionally resonant, magnetostrictive tube which is driven at its resonant frequency by a single turn winding. One end of the tube is clamped in a fixed position and the other free end is formed into the mirror. The basic scanner is capable of producing one dimensional sinusoidal deflection functions; however, combinations as illustrated can produce triangular, sawtooth or various types of two-dimensional scanning functions. A more complete understanding of the operation of the mirror pairs along with the vertical scanner 124 to produce a raster scan pattern on the field of view 126 may be had by referring to the copending U.S. Pat. application of Gerald R. Fournier et al., filed Dec. 31, 1968 Ser. No. 788,259, and assigned to the assignee of the present invention.

Laser radiation reflected from the field of view 126 passes through a collecting lens 128 having a narrow band pass optical coating centered at the frequency of the light beam generated by the laser 106. From the collecting lens 128, reflected radiation is directed to a beam splitter 130 which passes one portion of the reflected light to a linearly polarized detector 132 and directs another beam of the reflected energy to a linearly polarized detector 134. The amount of light impinging on each of the detectors 132 and 134 is determined by the degree of polarization of the light reflected from the field of view 126.

Output voltages from the detectors 132 and 134 may be passed through an amplifier in a manner as illustrated in FIG. 1. The output of each of these amplifiers (not shown) connects to one input of a video processor 136. The video processor 136 considers the two outputs from the detectors 132 and 134 and generates a display signal to a cathode-ray tube display 138.

Figure 7:
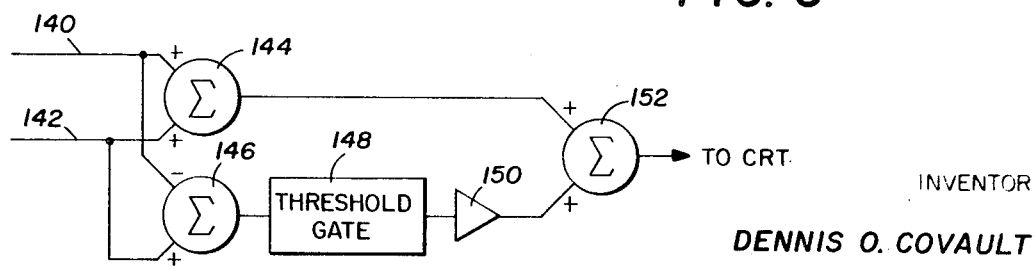
FIG. 7 is an optics diagram of a laser scanning system for object identification by means of the degree of scattering of polarized light illuminating the object.

Referring to FIG. 7, there is shown a block diagram of the video processor 136 including input lines 140 and 142 connected to the output of amplifiers for the detectors 132 and 134, respectively. Voltages on the lines 140 and 142 are applied to inputs of a summing network 144 and inputs to a differential network 146. An output of the differential network 146 is applied to a threshold gate circuit 148 which has an output terminal connected to an amplifier 150. The output of the amplifier 150 is applied to one input terminal of a summing network 152 which has a second input terminal connected to the output terminal of the summing network 144. The summing network 152 produces display signals applied to the input of the CRT display 138.

In operation, assume that an object target is illuminated by the linearly polarized beam from the laser 106 as it scans the field of view 126. If the polarization state of this beam is represented by the vector, $\vec{a}$, and the reflected radiation, which is sensed by a linearly polarized detector, such as detectors 132 and 134, whose polarization is represented by the vector, $\vec{b}$, then the voltage output of the detector will be given by the expression:

$$V_{ba} = \vec{b} \cdot S\vec{a} \quad (16)$$

where $V_{ba}$ equals the reflected radiation voltage from one of the detectors 132 or 134. Since the laser 106 produces a linearly polarized beam, a coordinate system can be selected such that:

$$A = \begin{pmatrix} 1 \\ 0 \end{pmatrix} \text{ and } B = \begin{pmatrix} \cos \psi \\ \sin \psi \end{pmatrix} \quad (17)$$

where the angle $\psi$ is the angle between the polarization vector of the transmitted beam and the polarization vector of the linear polarizer. Using this coordinate system and the equation (16), the voltage output of a linearly polarized detector can be written as:

$$V_{ba} = \begin{pmatrix} \cos \psi \\ \sin \psi \end{pmatrix} \cdot \begin{pmatrix} S_{11} S_{12} \\ S_{12} S_{22} \end{pmatrix} \begin{pmatrix} 1 \\ 0 \end{pmatrix}$$

$$= S_{11} \cos \psi + S_{12} \sin \psi \quad (18)$$

A linear detector output is proportional to the power incident thereon and is hence, proportional to the time average of $V_{ba}^2$ or:

$$|\overline{V_{ba}}|^2 = |S_{11}|^2 \cos^2 \psi + |S_{12}|^2 \sin^2 \psi$$
$$+ 2|S_{11} S_{12}| \sin \psi \cos \psi \, \overline{\cos (\phi_{11} - \phi_{12})} \quad (19)$$

where
$S_{11} = |S_{11}| \exp (i\phi_{11})$ and
$S_{12} = |S_{12}| \exp (i\phi_{12})$.

The phase, $\phi_{ij}$, of the scattering matrix elements should not be confused with $\psi$, the angle between the polarization of the transmitter and receiver. If there is good correlation between $S_{11}$ and $S_{12}$, i.e., a constant phase relationship, then the cross term contributes to the signal. However, for random phase relationship $\overline{\cos (\phi_{11} - \phi_{12})}$ is zero.

For a smooth reflector, the scattering matrix reduces to:

$$S = \begin{pmatrix} S_{11} & 0 \\ 0 & S_{22} \end{pmatrix} \quad (20)$$

where $S_{11}$ and $S_{22}$ are given by Fresnel's equation. In this case, the equation (19) reduces to:

$$|\overline{V_{ba}}|^2 = |S_{11}|^2 \cos^2 \psi \quad (21)$$

For a rough surfaced target in the field of view 126, there will be multiple reflections such that the reflected radiation will have random polarization causing the scattering elements to have the same magnitude and random phase. In this case, equation (19) reduces to:

$$|\overline{V_{ba}}|^2 = |S_{11}|^2 \quad (22)$$

which is independent of the angle between the polarization of the laser 106 and one of the linearly polarized detectors 132 or 134.

Thus, for a smooth surfaced object, the detectors 132 and 134 will have an output dependent upon their angle of orientation with respect to the polarized light output of the laser 106. On the other hand, for a rough-surfaced object in the field of view 126, each of the detectors 132 and 134 will produce a constant level output independent of their angle of orientation.

By combining each outputs of the detectors 132 and 134 in a system as illustrated in FIG. 7, the CRT display 138 will display a view of the area scanned with smooth surface objects enhanced.

While only preferred embodiments of the invention, together with modifications thereof, have been described in detail herein and shown in the accompanying drawings, it will be evident that various further modifications are possible without departing from the scope of the invention.

What is claimed is:

1. The method of identifying an object by determining the degree of polarization of energy radiating therefrom, comprising the steps of:
    measuring the polarized radiometric intensity from an object from along at least three planes of polarization,
    summing the radiometric intensity measurements as resulting from each of the planes of polarization to obtain a total intensity measurement,
    generating a signal representing the square of the total intensity measurement,
    processing the radiometric intensity measurements as resulting from each of the planes of polarization to produce an $I^2 P^2$ signal equal to the square of the degree of polarization of radiation from said object times the square of the total radiation intensity, and
    combining the signal representing the square of the total intensity measurement with the $I^2 P^2$ signal in a manner that results in a generated signal equal to the square of the degree of polarization of radiation from said object for identification thereof.

2. The method of identifying an object by determining the degree of polarization of energy radiating therefrom as set forth in claim 1 including the step of weighing the measured radiometric intensity from each of the planes of polarization by a factor related to the number of such measurements and the system response prior to summing the individual signals to obtain the total intensity measurement and processing to produce the $I^2 P^2$ signal.

3. The method of identifying an object by determining the degree of polarization of energy radiating therefrom as set forth in claim 1 wherein the step of processing the radiometric intensity measurements includes:
    generating a signal equal to $IP \cos 2\chi/2$ by combining the radiometric intensity measurement as resulting from each of the planes of polarization, and
    generating a signal equal to $IP \sin 2\chi/2$ by combining at least two of the radiometric intensity measurements.

4. The method of identifying an object by determining the degree of polarization of energy radiating therefrom as set forth in claim 3 wherein the step of processing the radiometric intensity measurements further includes the steps of:
    generating a signal representing the square of the signal $IP \cos 2\chi/2$,
    generating a signal representing the square of the signal $IP \sin 2\chi/2$, and
    summing the above two squared signals to produce the $I^2 P^2$ signal.

5. The method of identifying an object by determining the degree of polarization of energy radiating therefrom comprising the steps of:
    measuring the linear polarized radiometric intensity from an object by at least three infrared detectors each response to polarization along a different plane with respect to said object and calibrated from a source of known intensity radiation,
    summing the radiometric intensity measurements as resulting from each of the infrared detectors to generate an $I-I_o$ signal having a total intensity measurement component and a calibration intensity component,
    summing the generated $I-I_o$ signal with an $I_o$ signal equal to the calibration intensity component to obtain a total intensity measurement signal,
    generating a signal representing the square of the total intensity measurement,
    processing the radiometric intensity measurements as resulting from each of the infrared detectors to produce a $I^2 P^2$ signal equal to the square of the degree of polarization of radiation from the target times the square of the total radiation intensity, and
    combining the signal representing the square of the total intensity measurement with the $I^2 P^2$ signal in a manner that results in a generated signal equal to the square of the degree of polarization of radiation from the object for identification thereof.

6. The method of identifying an object by determining the degree of polarization of energy radiating therefrom as set forth in claim 5 including the step of generating a signal representation of the calibration source intensity component.

7. The method of identifying an object by determining the degree of polarization of energy radiating therefrom as set forth in claim 5 including the step of weighing each of the polarized radiometric intensity outputs from the infrared detectors by a factor related to the number of said detectors and the system response.

8. The method of identifying an object by determining the degree of polarization of energy radiating therefrom as set forth in claim 7 wherein the step of processing the radiometric intensity measurements includes:

generating a signal equal to $IP \cos 2\chi/2$ by combining the radiometric intensity measurement as resulting from each of the planes of polarization, and generating a signal equal to $IP \sin 2\chi/2$ by combining at least two of the radiometric intensity measurements.

9. The method of identifying an object by determining the degree of polarization of energy radiating therefrom as set forth in claim 8 wherein the step of processing the radiometric intensity measurements further includes:

generating a signal representing the square of the signal $IP \cos 2\chi/2$, generating a signal representing the square of the signal $IP \sin 2\chi/2$, and summing the above two squared signals to produce the $I^2P^2$ signal.

10. Apparatus for identifying an object by determining the degree of polarization of energy radiating therefrom, comprising:

means for measuring the polarized radiometric intensity from an object by at least three linearly polarized detectors responsive to radiation along different planes of polarization, means for summing the radiometric intensity measurements from each detector to obtain a total intensity measurement, means for generating a signal representing the square of the total intensity measurement, means for producing an $I^2P^2$ signal equal to the square of the degree of polarization of radiation from the object times the square of the total intensity measurement, and means for dividing the $I^2P^2$ signal by the signal representing the square of the total intensity measurement to produce a signal equal to the square of the degree of polarization of radiation from an object for identification thereof.

11. Apparatus for identifying an object by determining the degree of polarization of energy radiating therefrom as set forth in claim 10 including means for calibrating said measuring means from a source of known radiometric intensity.

12. Apparatus for identifying an object by determining the degree of polarization of energy radiating therefrom as set forth in claim 10 including means for weighing each of the radiometric intensity measurement signals by a factor related to the number of detectors and the system response.

13. Apparatus for identifying an object by determining the degree of polarization of energy radiating therefrom as set forth in claim 10 wherein said measuring means includes linearly polarized infrared detectors responsive to radiation from an object.

14. Apparatus for identifying an object by determining the degree of polarization of energy radiating therefrom as set forth in claim 10 wherein said means for producing the $I^2P^2$ signal includes:

a first summing network for adding the radiometric intensity measurement signals and having an output equal to $IP \cos 2\chi/2$, and a second summing network having at least two of the measurement signals as inputs thereto and having an output equal to the $IP \sin 2\chi/2$.

15. Apparatus for identifying an object by determining the degree of polarization of energy radiating therefrom as set forth in claim 14 wherein said means for producing the $I^2P^2$ signal further includes:

means responsive to the output of said first summing network for squaring the $IP \sin 2\chi/2$ signal, means responsive to the output of said second summing network for squaring the $IP \sin 2\chi/2$ signal, and means for generating a signal equal to the sum of the outputs of said squaring means.

* * * * *